E. W. NELSON.
SHUTTER MECHANISM FOR MOTION PICTURE MACHINES.
APPLICATION FILED AUG. 4, 1919.
1,417,098.
Patented May 23, 1922.
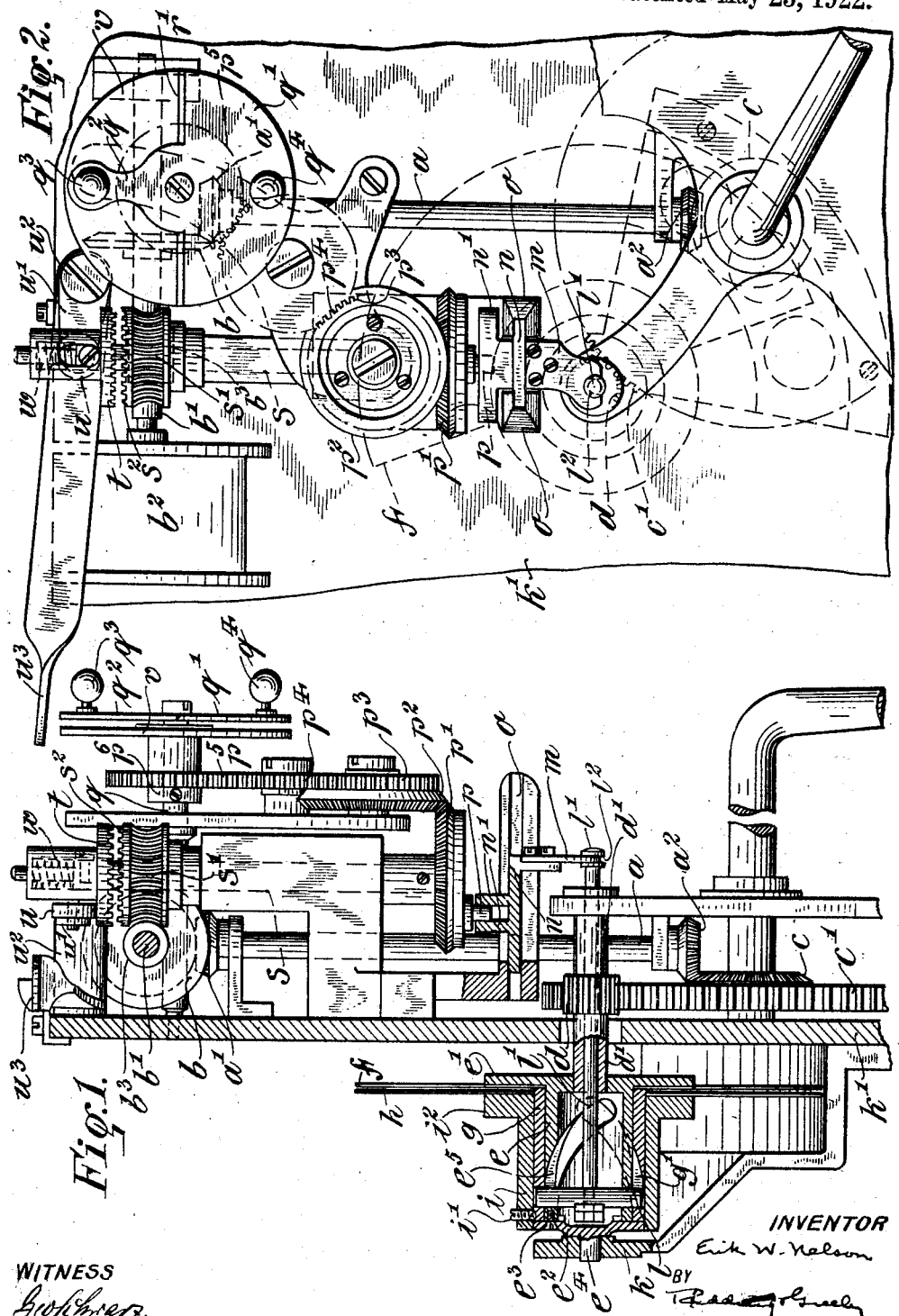
INVENTOR
Erik W. Nelson
BY
ATTORNEYS
WITNESS

UNITED STATES PATENT OFFICE.

ERIK W. NELSON, OF NEW ROCHELLE, NEW YORK.

SHUTTER MECHANISM FOR MOTION-PICTURE MACHINES.

1,417,098. Specification of Letters Patent. Patented May 23, 1922.

Application filed August 4, 1919. Serial No. 315,093.

*To all whom it may concern:*

Be it known that I, ERIK W. NELSON, a citizen of the United States, residing in Sycamore Park, New Rochelle, in the State of New York, have invented certain new and useful Improvements in Shutter Mechanism for Motion-Picture Machines, of which the following is a specification, reference being had to the accompanying drawings, forming a part hereof.

This invention relates to shutter mechanism for motion picture machines of the same general type as is covered by U. S. Letters Patent No. 1,119,924, dated December 8, 1914, in which the shutter is composed of a plurality of segments which are relatively adjustable for the purpose of regulating the extent of the opening in the shutter. In said patent the relation of the shutter segments is controlled by a hand lever. In accordance with the present invention there is provided, in association with the adjusting devices, a visual indicator which is composed of relatively movable elements constituting a miniature of the shutter segments.

A further feature of the invention resides in the provision of means for connecting the adjusting devices operatively with the main drive shaft of the machine whereby the angular relation of the shutter segments is automatically and constantly varied so long as said devices are connected with the main shaft. By this construction, the "dissolving" effect which is now so common, is automatically secured.

Still another object of the invention is to include in a machine of the character described manually operable means for adjusting the angular relation of the shutter segments and means for connecting the adjusting devices operatively to the main drive shaft so that the desired adjustment can be effected manually or automatically, a visual indicator comprising a miniature of the shutter segments being connected operatively to both of such means so that the true relation of the shutter segments is reproduced at all times by the miniature.

Reference is now to be had to the accompanying drawings for a detailed description of one embodiment of the improvements, in which—

Figure 1 is a view in vertical section through a portion of the housing and showing so much of the operating mechanism of the machine and the improved shutter mechanism as is necessary for an understanding of the relation of the parts to one another.

Figure 2 is a view in elevation of the mechanism shown in Figure 1 and looking toward the left in Figure 1.

The main drive shaft, for the purposes of this description, may be considered as the vertically disposed shaft $a$ to which rotative movement may be imparted from any usual source of power. The shaft $a$ carries at its upper end, a bevel pinion $a^1$ which meshes with a bevel gear $b$ fixed on a transverse shaft $b^1$ which drives the film feeding mechanism, part of which is conventionally illustrated at $b^2$. On the lower end of the shaft $a$ is fixed a bevel pinion $a^2$ which meshes with a bevel gear $c$ carried on the face of a spur gear $c^1$, which, in turn, meshes with a spur pinion $d$ on the hollow drive shaft $d^1$ for the shutter. On the shaft $d^1$ is fixed a cylinder $e$ formed with an annular flange $e^1$ to which is secured one of the shutter segments $f$. On the cylinder $e$ is mounted rotatably a sleeve $g$ with which is mounted another shutter segment $h$. An outer sleeve $i$ may be supported on the sleeve $g$ and be secured thereto by means of a set screw $i^1$, this covering sleeve $i$ having an annular flange $i^2$ against which bears the shutter segment $h$. The open end of the cylinder $e$ may be closed by a cap $e^2$ which is secured to the sleeve by means of a set screw $e^3$ and carries a trunnion $e^4$ journalled in a bracket $k$ mounted on the wall $k^1$ of the housing. The cylinder $e$ is formed with a spiral slot $e^5$ and the sleeve $g$ is formed with an opposed spiral slot $g^1$. With these slots $e^5$, $g^1$ engages a pin $l$ secured to a rod $l^1$ which is slidably mounted in the hollow shaft $d^1$. The movement of the rod $l^1$ will effect relative rotation of the shutter segments $f$, $h$, through the engagement of the pin $l$ with the opposed slots $e^5$, $g^1$. This invention is concerned with the provision of means for moving the rod $l^1$, either manually or by power, and with indicating devices for reproducing, in miniature, the true relation of the shutter segments at all times.

The means for effecting the manual adjustment of the shutter segments will first be described. The end of the rod $l^1$ is grooved, as at $l^2$, to permit the loose engagement therewith of an arm $m$ which is secured to a sliding carrier $n$ mounted for reciprocation in channeled guides $o$ which may be supported on the housing in any convenient manner. On the upper face of the block $n$ are formed two transverse flanges $n^1$, spaced to constitute a channel in which is loosely disposed a pin $p$. This pin $p$ is carried on the face of a bevel gear $p^1$ with which meshes a bevel gear $p^2$, on the face of which is carried a spur gear $p^3$ to which rotative movement is imparted through an idler gear $p^4$ and actuating gear $p^5$. The gear $p^5$ has its hub $p^6$ pinned to a shaft $q$ to the end of which is secured a segment $q^1$. The segment $q^1$ may have formed therewith an arm $q^2$ on which is mounted a knob $q^3$ to afford a convenient grip member for manual operation. On the face of the segment $q^1$ proper may also be fixed another hand knob $q^4$.

From the description given it will be evident that when the segment $q^1$ is rotated by hand the pin $p$ will be revolved around the axis of the gear $p^1$ and by reason of its engagement with the block $n$ rectilinear motion will be imparted to the latter. This movement of the block $n$ will be transmitted to the rod $l^1$ and the angular relation of the shutter segments $f$, $h$, will be varied in the manner heretofore described.

In order to reproduce, in miniature, the exact relation of the shutter segments $f$, $h$, a visual indicator is provided of which the segment $q^1$ is one element. The other element is a fixed disk $v$, which is supported in juxtaposition to the segment $q^1$ and preferably has the two halves of its face of different color, with respect to a horizontal median line $r^1$. The upper half of the face of the disk $v$ might, for instance, be colored dark to correspond to the coloring of the segment $q^1$ so that when the segment $q^1$ is in the position indicated in Figure 2, the indicator will show, as a whole, a dark disk, thereby indicating that the two segments $f$, $h$, of the shutter are in the same relative position and constitute an unbroken shutter, which cuts off all light. The lower half of the disk $v$ might be colored light, so that when the segment $q^1$ is rotated from the position shown in Figure 2 to change the angular relation of the shutter segments $f$, $h$, a sector, light in color, will be formed between the median line $r^1$ and one of the radial edges of the segment $q^1$. This sector will be a faithful reproduction in miniature, of the sector between the shutter segments $f$, $h$, through which light may pass.

In the improved machine there are included means for connecting the rod $l^1$ operatively to the main source of power, so that the angular relation of the shutter segments $f$, $h$, will be automatically and constantly varied so long as the rod is thus connected to the source of power. In accordance with the illustrated embodiment of the invention the bevel gear $p^1$ is carried on the lower end of a vertical shaft $s$, on the upper end of which is feathered a slidable clutch gear $t$. On the upper face of this clutch element $t$ rests a roller $u$ carried on an arm $u^1$ of a rock shaft $u^2$, to which is secured an operating lever $u^3$. On the shaft $s$ is loosely mounted a worm gear $s^1$ with which engages a worm $b^3$ carried on the horizontal shaft $b^1$. On the hub of the worm gear $s^1$ are formed teeth $s^2$ adapted to be engaged by the teeth of the slidable clutch element $t$ when this element is moved along the shaft $s$ by means of the operating lever $u^3$ and the associated devices. Normally, the clutch element $t$ is held out of engagement with the worm gear $s^1$ by means of a suitable spring $w$ in a manner which will be evident.

When it is desired to change the angular relation between the segments $f$, $h$, automatically, the clutch $t$ is engaged with the worm gear $s^1$, thereby transmitting rotative movement from the power shaft $b^1$ to the bevel gear $p^1$. The pin $p$ then slides the block $n$ in the manner previously described and causes, automatically, a change in the angular relation between the shutter segments. This angular relation will be constantly varied so long as the clutch $t$ is engaged with the worm gear $s^1$, the effect being to secure a "dissolving" picture.

The variation of the angular relation between the shutter segments $f$, $h$, by the connection of the adjusting devices to the source of power will be faithfully reproduced by the visual indicator since the segment $q^1$ is constantly connected with the bevel gear $p^1$. When the relation of the segment $q^1$ to the disk $v$ indicates that the shutter segments $f$, $h$, are in the desired relative position the adjusting devices for said segments may be quickly disconnected from the source of power by disengaging the clutch element $t$ from the worm gear $s^1$.

The invention is not to be limited to the precise embodiment described herein since it is evident that the broad features may be realized in structures which differ mechanically from that illustrated and yet effect the desired results.

I claim as my invention:

1. In a motion picture camera, in combination with the main drive shaft, a plurality of shutter segments, devices for changing the angular relation of the segments, and means to connect said devices operatively with the main drive shaft including a shaft operatively connected with said devices, a gear loosely mounted on the shaft, a second shaft driven from the main shaft and carrying a gear in mesh with the first named gear, and a slidable clutch element splined on the first named shaft and engageable with the first named gear.

2. In a motion picture camera, shutter segments, sleeves on which the segments are carried provided with opposed spiral slots, a hollow shaft to rotate one of the sleeves, a rod slidably mounted in the shaft and having a pin to engage the slots, a slidable element in engagement with the rod, and means to reciprocate the sliding element.

3. In a motion picture camera, shutter segments, sleeves on which the segments are carried provided with opposed spiral slots, a hollow shaft to rotate one of the sleeves, a rod slidably mounted in the shaft and having a pin to engage the slots, a slidable element in engagement with the rod, manual and power means to reciprocate the sliding element and devices to disconnect the power therefrom.

4. In a motion picture camera, shutter segments, sleeves on which the segments are carried provided with opposed spiral slots, a hollow shaft to rotate one of the sleeves, a rod slidably mounted in the shaft and having a pin to engage the slots, a slidable element in engagement with the rod, manual and power means to reciprocate the sliding element, devices to disconnect the power means therefrom, and a visual indicator connected operatively with the shutter segments to show their angular relation.

5. In a motion picture camera, shutter segments, sleeves on which the segments are carried, both sleeves being provided with slots, one slot being spiral, a hollow shaft to rotate one of the sleeves, a rod slidably mounted in the shaft and having a pin to engage the slots, a slidable element in engagement with the rod, and means to reciprocate the sliding element.

This specification signed this 29th day of July, A. D., 1919.

ERIK W. NELSON.